United States Patent
Brooks et al.

(10) Patent No.: US 10,616,328 B2
(45) Date of Patent: Apr. 7, 2020

(54) UPDATING FILES BETWEEN COMPUTING DEVICES VIA A WIRELESS CONNECTION

(71) Applicant: Hewlett-Packard Development Company, L.P., Houston, TX (US)

(72) Inventors: Robert C Brooks, Houston, TX (US); Kent E Biggs, Tomball, TX (US); Shaheen Saroor, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 233 days.

(21) Appl. No.: 15/306,688

(22) PCT Filed: Aug. 27, 2014

(86) PCT No.: PCT/US2014/052864
§ 371 (c)(1),
(2) Date: Oct. 25, 2016

(87) PCT Pub. No.: WO2016/032455
PCT Pub. Date: Mar. 3, 2016

(65) Prior Publication Data
US 2017/0063987 A1   Mar. 2, 2017

(51) Int. Cl.
*G06F 17/30* (2006.01)
*H04L 29/08* (2006.01)
(Continued)

(52) U.S. Cl.
CPC ........ *H04L 67/1095* (2013.01); *G06F 16/178* (2019.01); *H04W 4/023* (2013.01);
(Continued)

(58) Field of Classification Search
USPC ........ 707/607, 609, 687, 709, 750, 813, 821
See application file for complete search history.

(56) References Cited

U.S. PATENT DOCUMENTS 8,745,127 B2   6/2014  Gopal et al.
2004/0172423 A1   9/2004  Kaasten et al.
(Continued)

FOREIGN PATENT DOCUMENTS

CN   102113352   6/2011
TW   201227293   7/2012

OTHER PUBLICATIONS

Suel of al., "Improved File Synchrontzation Techniques for Maintaining Large Replicated Collections Over Slow Networks," 2004. pp. 1-12. <cis.poly.edu/suel/papers/sync.pdf>.
(Continued)

*Primary Examiner* — Sana A Al-Hashemi
(74) *Attorney, Agent, or Firm* — HP Inc. Patent Department

(57) ABSTRACT

In an example implementation according to aspects of the present disclosure, a method may include detecting, by a first-computing device, a second computing device when the second computing device is in physical proximity to the first computing device, and establishing a secure wireless connection between the first and second computing devices while the first and second computing devices remain in physical proximity to each other. The method further includes determining, for each file stored on the second computing device, whether the file or a corresponding file stored on the first computing device is the later version, and updating, by the first computing device, the file and the corresponding file stored on the first computing device to the later version.

20 Claims, 2 Drawing Sheets

(51) Int. Cl.
*G06F 16/178* (2019.01)
*H04W 76/14* (2018.01)
*H04W 4/02* (2018.01)
*H04W 4/80* (2018.01)

(52) U.S. Cl.
CPC .............. *H04W 76/14* (2018.02); *H04L 67/06* (2013.01); *H04W 4/80* (2018.02)

(56) References Cited

U.S. PATENT DOCUMENTS

| | | |
|---|---|---|
| 2009/0150569 A1 | 6/2009 | Kumar et al. |
| 2010/0030840 A1 | 2/2010 | Oshea et al. |
| 2011/0154255 A1 | 6/2011 | Je-Hyok et al. |
| 2012/0331155 A1 | 12/2012 | Sunderrajan et al. |
| 2013/0104114 A1* | 4/2013 | Reiss ........................ G06F 8/38 717/170 |
| 2013/0138608 A1 | 5/2013 | Smith |
| 2013/0275509 A1 | 10/2013 | Micucci et al. |
| 2013/0305102 A1* | 11/2013 | Malnati ............... G06F 11/3055 714/49 |
| 2014/0013100 A1 | 1/2014 | Menzel et al. |
| 2014/0053227 A1 | 2/2014 | Ruppin et al. |
| 2014/0105046 A1* | 4/2014 | Tellado ................. H04W 64/00 370/252 |
| 2014/0188803 A1 | 7/2014 | James et al. |

OTHER PUBLICATIONS

Moghadam et al: "7DS—A Nodular Platform to Develop Mobile Disruption-Tolerant Applications", NGMAST '08, IEEE, Sep. 16, 2008 ~ 7 pages.

* cited by examiner

_(1)_

UPDATING FILES BETWEEN COMPUTING DEVICES VIA A WIRELESS CONNECTION

BACKGROUND

Computing devices such as laptops, smart phones, and tablets have increased in popularity. Many individuals own at least one (if not multiple) of these types of devices, which may frequently be used for tasks such as checking email, browsing the Internet, taking photos, playing games, and other such activities. Additionally, these devices may be used to create files from computer applications loaded on the devices, such as a word processor application.

BRIEF DESCRIPTION OF THE DRAWINGS

The following detailed description references the drawings, in which.

DETAILED DESCRIPTION

As a user may own multiple computing devices, files created by the user on one device may not be automatically or readily available on the other devices. This may be inconvenient or a source of frustration for the user to create and/or modify a file on one device, and not be able to access that file easily, or at all, from the other devices. For example, modifications to a file on one device may not make it to the file located on the other devices. As a result this can result in viewing an older version of the file on the other devices.

Examples disclosed herein provide solutions for allowing the latest version of a file to be readily available on all computing devices of a user. As an example, a computing device the user is to have on his possession may function as a "file cache" for storing recently accessed files of the user on the various computing devices of the user. The file cache may allow for the latest version of a file to be readily available on all computing devices of the user, as will be further described. Examples of a computing device a user is likely to have on his possession include, but are not limited to, a smartphone or a wearable device, such as a smart watch.

Figure 1:
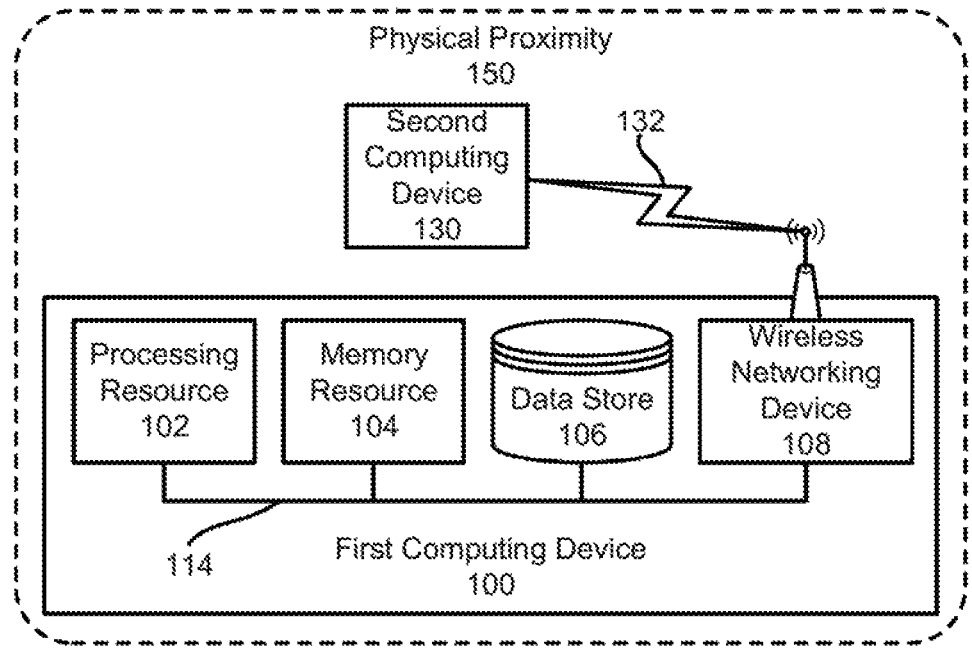
FIG. 1 illustrates a block diagram of a secure wireless connection between a first computing device and a second computing in physical proximity to the first computing device, according to an example.

Referring now to the figures, FIG. 1 illustrates a block diagram of a secure wireless connection 132 between a system including at least a first computing device 100 and a second computing device 130 in physical proximity 150 to the first computing device 100, according to an example. As will be further described, while the computing devices 100, 130 remain in physical proximity, recently accessed files between the devices 100, 130 may be synchronized. As a result, if a user has the second computing device 130 on his possession and later comes in physical proximity with another computing device (e.g., a third computing device 230 in FIG. 2), file synchronization will then occur between the second computing device 130 and the third computing device. Therefore, the third computing device may have access to files recently accessed and/or modified from the first computing device 100.

FIG. 1 includes particular components, modules, etc. according to various examples. However, in different implementations, more, fewer, and/or other components, modules, arrangements of components/modules, etc. may be used according to the teachings described herein. In addition, various components, modules, etc. described herein may be implemented as software modules, hardware modules, special-purpose hardware (e.g., application specific hardware, application specific integrated circuits (ASICs), embedded controllers, hardwired circuitry, etc.), or some combination of these.

The first computing device 100 may include a processing resource 102 that represents generally any suitable type or form of processing unit or units capable of processing data or interpreting and executing instructions. The instructions may be stored on a non-transitory tangible computer-readable storage medium, such as memory resource 104, or on a separate device (not shown), or on any other type of volatile or non-volatile memory that stores instructions to cause a programmable processor to perform the techniques described herein. Alternatively or additionally, the first computing device 100 may include dedicated hardware, such as integrated circuits, Application Specific integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In addition to the processing resource 102 and the memory resource 104, the first computing device 100 may include a data store 106 for storing a variety of data, such as files created from computer applications loaded on the device 100, such as a word processor application. The first computing device 100 also includes a wireless networking device 108 in the example illustrated in FIG. 1. However, in ether examples, additional networking devices may be utilized, in the example shown, the wireless networking device 108 facilitates a secure connection 132 to the second computing device 130, as will be discussed in more detail below.

The components described as making up the first computing device 100 (e.g., the processing resource 102, the memory resource 104, the data store 108, and the wireless networking device 108) are electronically coupled such as through wires, cabling, and/or electronic circuitry via a system bus 114 that may include a data bus to carry information, an address bus to determine where information should be sent, and a control bus to determine operation. In other examples, individual buses may be utilized rather than a combined system bus, and the term "system bus" should not be construed as limiting the type of bus or buses utilized in connecting the components of the first computing device 100. As an example, the second computing device 130 may have similar components as those described above for the first computing device 100. For example, referring to FIG. 2, the second computing device 130 may include a processing resource 202, a memory resource 204, a data store 206, and a wireless networking device 208. The components described as making up the second computing device 130 are electronically coupled such as through wires, cabling, and/or electronic circuitry via a system bus 214.

A second computing device 130 that is in physical proximity 150 to the first computing device 100 is wirelessly, communicatively coupled to the first computing device 100.

It should be understood that the second computing device 130 may include any appropriate type of computing device, particularly a device a user is likely to have on his possession. Examples of a computing device a user is likely to have on his possession include, but are not limited to smartphones, tablets, laptops, wearable devices, such as a smart watch, or the like. By having the computing device on the user's possession most or all of the time, the computing device may function as a "file cache" for storing recently accessed files of the user on the various computing devices of the user. The second computing device 130 may include an operating system, such as Android®, Microsoft® Windows®, Apple® iOS®, or another suitable operating system.

The second computing device 130 connects wirelessly to the first computing device 100 via the wireless networking device 108 of the first computing device 100 using a secure connection. A user of the second computing device 130 may request the secure connection with the first computing device 100. However, in other examples, such a request may occur automatically rather than at the request of the user (e.g., when the second computing device 130 comes within proximity 150 of the first computing device 100). Once the request is received by the first computing device 100, the first computing device 100 establishes the secure connection 132 to the second computing device 130 via the wireless networking device 108.

In order to establish the secure connection 132, the second computing device 130 should be in a physical proximity 150 to the first computing device 100. The physical proximity 150 is shown in FIG. 1 as an area extending a distance around the first computing device 100. The distance may be determined by the signal strength of the wireless networking device 108 or by other suitable methods. In examples, the distances may vary, and may be 5 feet, 10 feet, 20 feet, 25 feet, 40 feet, or other suitable distances, if the second computing device 130 is outside the physical proximity 150, the second computing device 130 will be unable to form a secure connection 132 with the first computing device 100.

As an example, a file synchronization application may be installed on the first computing device 100 and other computing devices of a user. Referring to FIG. 1, once the first computing device 109 detects that the second computing device 130 has come within physical proximity 150 of the first computing device 100 (e.g., via the file synchronization application installed on the first computing device 100), the first computing device 100 may establish the secure wireless connection 132, The secure connection 132 may establish a network, such as an ad hoc network or a peer-to-peer (P2P) network, between the first computing device 100 and the second computing device 130. Information is transmitted between the first computing device 100 and the second computing device 130 securely, such as through a remote desktop protocol session, a virtual private network session, or another suitable secure method. As an example, data exchanged between the first and second computing devices 100, 130 may be encrypted. The secure wireless connection 132 may remain established while the second computing device 130 is in physical proximity 150 to the first computing device 100, and may terminate if the second computing device 130 travels outside the physical proximity 150.

Once the secure wireless connection 132 is established, for each file stored on the second computing device 130, the first computing device 100 may determine whether the file, or a corresponding file stored on the first computing device 100 (e.g., on the data store 108) is the later version. For each file stored on the second computing device 130, the first computing device 100 may update, via the secure wireless connection 132, the file and the corresponding file stored on the first computing device 100 to the later version. As a result, the files stored on both the first and second computing devices 100, 130 are synchronized, and multiple versions of a file may be avoided between the devices 100, 130.

There may be situations when a file stored on the first computing device 100 may not be stored on the second computing device 130, and vice versa. For example, a file may have been created on another computing device, and synchronized with the second computing device 130 while it was in physical proximity to the other computing device. As an example, the first computing device 100 may determine whether a file stored on the second computing device 130 is stored in the data store 108 of the first computing device 100. The first computing device 100 may copy the file, via the secure wireless connection 132, to the date store 106 of the first computing device if it is determined that the file is not present. Similarly, the first computing device 100 may determine whether recently accessed files stored on the first computing device 100 are stored on the second computing device 130. If the recently accessed files are not present on the second computing device 130, the first computing device 100 may copy, via the secure wireless connection 132, such files to the second computing device 130. As a result, the second computing device 130 may have the recently accessed files from the first computing device 100.

As the storage space on the second computing device 130 may be limited, and may only have the capacity to store only the most recently accessed files ("file cache"), the first computing device 100 may determine whether the second computing device 130 has sufficient storage space prior to copying any files over to the second computing device 130. If the second computing device 130 does not have sufficient storage space, the first computing device 100 may delete the leas recently used files from the second computing device 130 in order to accommodate recently accessed files from the first computing device 100. As an example, upon determining that the second computing device 130 does not have sufficient storage space, the second computing device 130 may receive a request from the first computing device 100 to make sufficient space available for the recently accessed files. Thereafter, the second computing device 130 may determine which files to delete (e.g., the least recently used files). Upon determining the second computing device 130 has sufficient storage space, the first computing device 100 may copy the recently accessed files to the second computing device 130.

While the second computing device 130, which the user is likely to have on his possession, is in physical proximity 150 to the first computing device 100, the user may access and change files stored on the first computing device 100. As an example, while the first and second computing devices 100, 130 remain in physical proximity 150 to each other, the first computing device 100 may update files stored on the second computing device 130 when corresponding files stored in the data store 106 of the first computing device 100 are accessed and changed.

Figure 2:
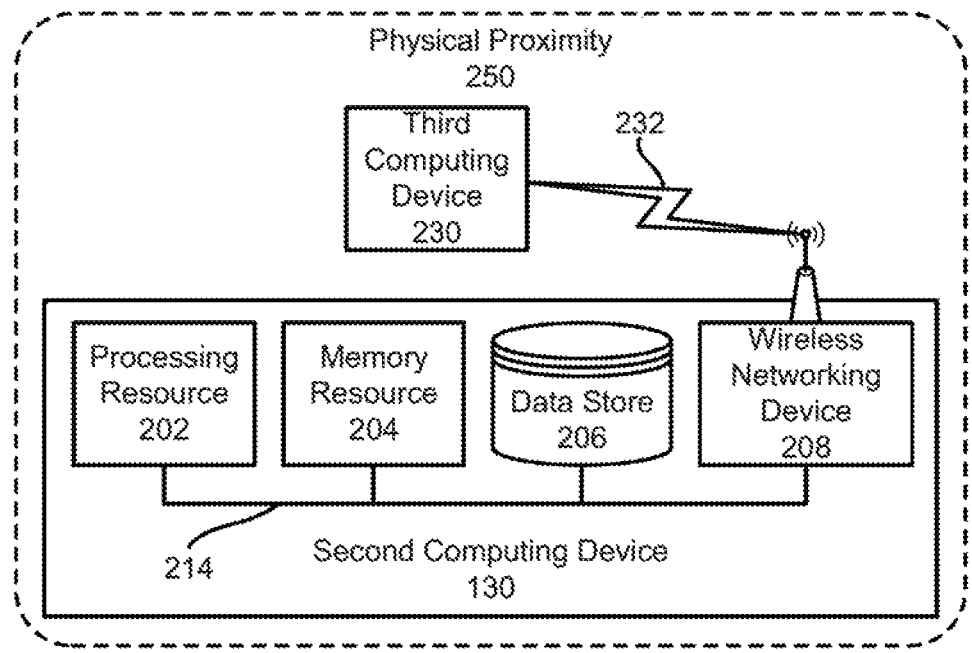
FIG. 2 illustrates a block diagram of a secure wireless connection between the second computing device and a third computing device in physical proximity to the second computing device, according to an example.

FIG. 2 illustrates a block diagram of a secure wireless connection 232 between the second computing device 130 and a third computing device 230 (e.g., host computing device) in physical proximity 250 to the second computing device 130, according to an example. As mentioned above, a user may own multiple computing devices. For example, the first computing device 100 (see FIG. 1) may be a desktop computer, and the third computing device 230 may be a notebook computer. If may be desirable for files that are created or modified on one device (e.g., first computing device 100) to be readily available on another device (e.g., third computing device 230).

Referring to FIG. 2, once the second computing device 130 is in physical proximity 250 to the third computing device 230, a secure wireless connection 232 may be established between the devices 130, 230. Upon securing the connection 232, recently accessed files between the devices 130, 230 may be synchronized. As an example, files that have been recently accessed and/or modified from the first computing device 100, that are now available on the second computing device 130 via secure wireless connection 132 (e.g., see FIG. 1), may now be readily available to the third computing device 230 once the second computing device 130 is in physical proximity 250 to the third computing device 230. A system, including at least the first computing device 100, second computing device 130, and third computing device 230, may allow for files, particularly recently accessed files, to remain synchronized between the devices. For example, as the user may have the second computing device 130 on his possession, the second computing device 130 may synchronize files with either the first or third computing device 100, 230 as the second computing device 130 comes within proximity of either device.

Similar to the first computing device 100, the third computing device 230 may have a processing resource, memory resource, data store, and a wireless networking device. As an example, the third computing device 230 may have a file synchronization application installed for detecting when a computing device, such as the second computing device 130 comes within physical proximity 250 of the third computing device 230. However, the second computing device 130 may also have the file synchronization application installed for detecting when it comes within physical proximity 250 of the third computing device 230. Once the secure wireless connection 232 is established between the second computing device 130 and the third computing device 230, file synchronization may occur, as described above.

As used through the disclosure, the networks formed through the secure connections 132 and 232 represent generally available hardware components and computers interconnected by communications channels that allow sharing of resources and information. The networks may include a cable, wireless, fiber optic, and/or remote connection via a telecommunication link, an infrared link, a radio frequency link, or any other connectors or systems that provide electronic communication. The networks may include, at least in part, an Intranet, the internet, or a combination of both. The networks may also include intermediate proxies, routers, switches, load balancers, and the like.

Figure 3:
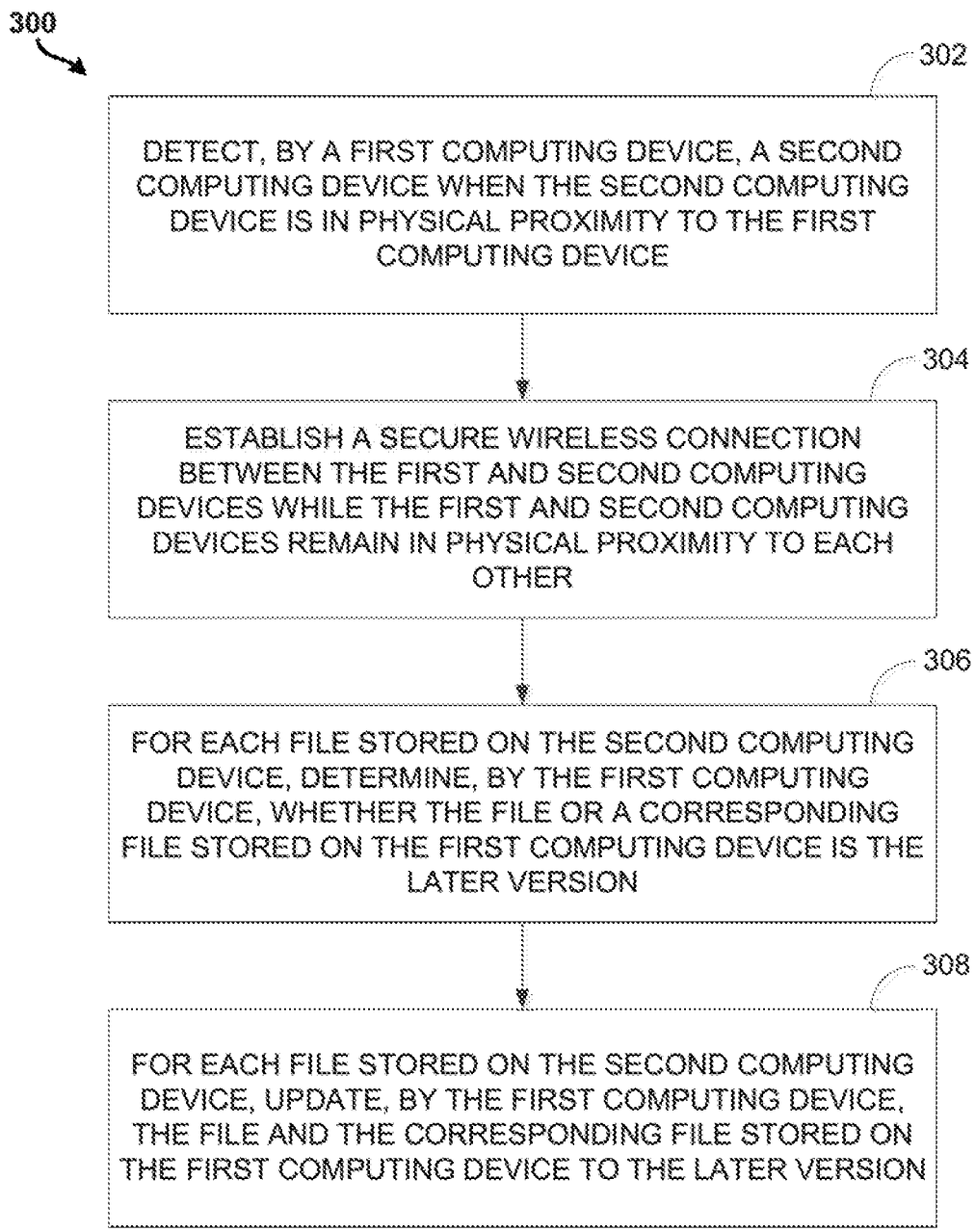
FIG. 3 is a flow diagram depicting steps to implement an example.

Referring to FIG. 3, a flow diagram is illustrated in accordance with various examples. The flow diagram illustrates, in a particular order, processes for synchronizing files, particularly recently accessed files, between computing devices of a user. The order of the processes is not meant to limit the disclosure. Rather, it is expressly intended that one or more of the processes may occur in other orders or simultaneously. The disclosure is not to be limited to a particular example.

A method 300 may begin and progress to 302, where a first computing device may detect a second computing device when the second computing device is in physical proximity to the first computing device.

Progressing to 304, the first computing device may establish a secure wireless connection between the first and second computing devices while the first and second computing devices remain in physical proximity to each other.

Progressing to 308, for each file stored on the second computing device, the first computing device may determine whether the file or a corresponding file stored on the first computing device is the later version.

Progressing to 308, for each file stored on the second computing device, the first computing device may update the file and the corresponding file stored on the first computing device to the later version. As an example, while the first and second computing devices remain in physical proximity to each other, files stored on the second computing device may be updated when corresponding files stored on the first computing device are accessed and changed.

As an example, the first computing device may determine whether a recently accessed file stored on the first computing device is stored on the second computing device, and copy the recently accessed file to the second computing device if the file is not stored on the second computing device. If the first computing device determines that the second computing device does not have sufficient storage space to accommodate the recently accessed file, the first computing device may delete least recently used files from the second computing device in order to accommodate the recently accessed file.

Similarly, the first computing device may determine whether a file stored on the second computing device is stored on the first computing device. If the file is not stored on the first computing device, the file may be copied to the first computing device from the second computing device.

As an example, if the user has the second computing device on his possession and later comes in physical proximity with a third computing device, the third computing device may detect the second computing device and establish a secure wireless connection. The secure wireless connection may be maintained while the second and third computing devices remain in physical proximity to each other. The files between the second and third computing devices, particularly the recently accessed files, may be synchronized. As an example, the third computing device may copy files from the second computing device that correspond to files that were synchronized while the second computing device was in physical proximity to the first computing device.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of ail elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
   detecting, by a first computing device, a second computing device when the second computing device is in physical proximity to the first computing device;
   while the first and second computing devices remain in physical proximity to each other:

establishing a secure wireless connection between the first and second computing devices that are in physical proximity to each other;

for a file stored in a file cache of the second computing device, determining, by the first computing device, whether the file or a corresponding file stored on the first computing device is a later version;

updating, by the first computing device, the file in the file cache with the corresponding file stored on the first computing device in response to the corresponding file stored on the first computing device being the later version than the file stored in the file cache of the second computing device, the updating causing storing of an updated version of the file in the file cache; and to copy a further file from the first computing device to the second computing device:

in response to determining, by the first computing device, that the second computing device does not have sufficient storage space for the further file, sending, by the first computing device to the second computing device, a request that causes deletion by the second computing device of a file from the file cache of the second computing device, and copying, by the first computing device, the further file to the second computing device after the deletion.

2. A first computing device comprising:

a processing resource;

a storage resource storing programming instructions;

a file cache; and a wireless networking device, wherein the programming instructions are executable by the processing resource to cause the first computing device to:

establish a secure wireless connection between the first computing device and a second computing device that are in physical proximity to each other;

while the first and second computing devices remain in physical proximity to each other, for a file stored in the file cache, update the file with a corresponding file stored on the second computing device responsive to a determination that the corresponding file stored on the second computing device is a later version than the file stored in the file cache, the updating causing storage of an updated file in the file cache; and copy the updated file from the file cache of the first computing device to a third computing device responsive to the first computing device being in physical proximity with the third computing device.

3. A non-transitory machine-readable storage medium comprising instructions that upon execution cause a first computing device to:

establish a secure wireless connection between the first computing device and a second computing device that are in physical proximity to each other;

while the first computing device and the second computing device are in physical proximity to each other, for a file stored in a file cache of the first computing device, determine that a corresponding file stored on the second computing device is a later version than the file stored in the file cache, and update the file with the corresponding file stored on the second computing device over the secure wireless connection responsive to the determining, the updating causing storage of an updated file, comprising the corresponding file, in the file cache; and copy the updated file from the file cache of the first computing device to a third computing device responsive to the first computing device being in physical proximity with the third computing device.

4. The method of claim 1, comprising:

determining, by the first computing device, whether an additional file stored in the file cache of the second computing device is stored on the first computing device; and copying, by the first computing device, the additional file from the file cache to the first computing device if the additional file is not stored on the first computing device.

5. The method of claim 1, comprising:

updating, while the first and second computing devices remain in physical proximity to each other, files stored on the second computing device when corresponding files stored on the first computing device are accessed and changed.

6. The method of claim 1, comprising:

determining, by the first computing device, whether a recently accessed file stored on the first computing device is stored in the file cache of the second computing device; and copying, by the first computing device, the recently accessed file to the second computing device if the recently accessed file is not stored in the file cache of the second computing device.

7. The method of claim 1, comprising:

detecting, by a third computing device, the second computing device when the second computing device is in physical proximity to the third computing device;

establishing a secure wireless connection between the third and second computing devices while the third and second computing devices remain in physical proximity to each other; and copying, by the third computing device, the updated version of the file from the file cache of the second computing device to the third computing device while the third and second computing devices remain in physical proximity to each other.

8. The method of claim 1, wherein the secure wireless connection is a peer-to-peer (P2P) network connection.

9. The first computing device of claim 2, wherein the programming instructions are executable to cause the first computing device to:

copy a further file from the second computing device to the first computing device responsive to a determination that the further file is not stored on the first computing device.

10. The first computing device of claim 2, wherein the programming instructions are executable to cause the first computing device to:

update, while the first computing device and the second computing device remain in physical proximity to each other, files stored in the file cache when corresponding files stored on the second computing device are accessed and changed.

11. The first computing device of claim 2, wherein the determination is performed by update instructions executed in the second computing device.

12. The first computing device of claim 2, wherein the programming instructions are executable to cause the first computing device to:

establish a secure wireless connection between the first and third computing devices responsive to the first computing device being in physical proximity with the third computing device, wherein the copying of the updated file from the file cache of the first computing device to the third computing device is over the secure wireless connection between the first and third computing devices.

13. The first computing device of claim 2, wherein the first computing device is a smartphone or a wearable device.

14. The non-transitory machine-readable storage medium of claim 3, wherein the instructions upon execution cause the first computing device to copy a further file from the second computing device to the first computing device responsive to a determination that the further file is not stored on the first computing device.

15. The non-transitory machine-readable storage medium of claim 3, wherein the instructions upon execution cause the first computing device to update, while the first computing device and the second computing device remain in physical proximity to each other, files stored in the file cache when corresponding files stored on the second computing device are accessed and changed.

16. The non-transitory machine-readable storage medium of claim 3, wherein the instructions upon execution cause the first computing device to:

establish a secure wireless connection between the first and third computing devices responsive to the first computing device being in physical proximity with the third computing device, wherein the copying of the updated file from the file cache of the first computing device to the third computing device is over the secure wireless connection between the first and third computing devices.

17. The non-transitory machine-readable storage medium of claim 3, wherein the first computing device is a smartphone or a wearable device.

18. The method of claim 6, wherein copying the recently accessed file comprises:

determining whether the second computing device has sufficient storage space to accommodate the recently accessed file;

if the second computing device does not have the sufficient storage space to accommodate the recently accessed file, deleting a least recently used file from the second computing device to accommodate the recently accessed file; and copying the recently accessed file to the second computing device upon determining the second computing device has the sufficient storage space to accommodate the recently accessed file.

19. The method of claim 7, wherein the second computing device comprising the file cache is a smartphone or a wearable device.

20. The method of claim 7, wherein the first, second, and third computing devices belong to a same user.

\* \* \* \* \*